United States Patent
Steeb et al.

(10) Patent No.: US 8,271,779 B2
(45) Date of Patent: Sep. 18, 2012

(54) PREPAID AND SUBSCRIPTION DISTRIBUTION SERVICES WEB METHODS

(75) Inventors: Curt A. Steeb, Redmond, WA (US); Gokul P. Thirumalai, Bellevue, WA (US); Jeffrey Alan Herold, Bothell, WA (US); Zeyong Xu, Issaquah, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1369 days.

(21) Appl. No.: 11/318,986

(22) Filed: Dec. 27, 2005

(65) Prior Publication Data

US 2007/0150725 A1    Jun. 28, 2007

(51) Int. Cl.
*H04L 29/06* (2006.01)
(52) U.S. Cl. ......................................................... 713/156
(58) Field of Classification Search .................... 713/156
See application file for complete search history.

(56) References Cited

U.S. PATENT DOCUMENTS

| | | | |
|---|---|---|---|
| 6,233,577 B1* | 5/2001 | Ramasubramani et al. | 707/9 |
| 6,463,534 B1* | 10/2002 | Geiger et al. | 713/168 |
| 6,862,684 B1* | 3/2005 | DiGiorgio | 713/163 |

* cited by examiner

*Primary Examiner* — Yin-Chen Shaw
*Assistant Examiner* — Harris Wang
(74) *Attorney, Agent, or Firm* — Joseph R. Kelly; Westman, Champlin & Kelly, P.A.

(57) ABSTRACT

A client data distribution service may receive messages from a client device requesting data sets from the data distribution service. The data sets may include a client certificate used to protect in verified subsequent communications between the client device in the data distribution service as well as provisioning packets used by the client device to enable operation by the user. Specific messages between the client device in the data distribution service include hardware identifiers, initialization keys, last used sequence numbers, and Underwriter product identifiers. Corresponding acknowledgment messages may be used by the data distribution service to remove completed transactions.

15 Claims, 3 Drawing Sheets

PREPAID AND SUBSCRIPTION DISTRIBUTION SERVICES WEB METHODS

BACKGROUND

Prepaid and subscription based devices, such as computers, personal digital assistants, media devices, etc., may be supported by a provisioning backend for initial registration and subsequent re-provisioning. However, a single web service or other provisioning backend may not be able to meet the dual goals of high security as well as highly scalable transaction processing support. Particularly in Third World countries, network access may be limited and/or unreliable requiring special care when processing out-of-band payments and online registration and re-provisioning.

SUMMARY

A transaction backend uses a core service and distribution database in the backend and a distribution service in the front-end for processing requests from client devices. The client device may request a client data set tailored to the specific device, such as a certificate for transaction support or a provisioning packet to extend use of a subscription or prepaid device. The client device may use a hardware identifier in combination with a product identifier and an initialization key to request a certificate as part of an initial registration. After registering, the client device may use the hardware identifier and a last-used sequence number to request provisioning packets already queued for delivery in the distribution service front-end. The distribution service provides fast transaction processing while the backend services support the transaction processing from a more secure environment.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
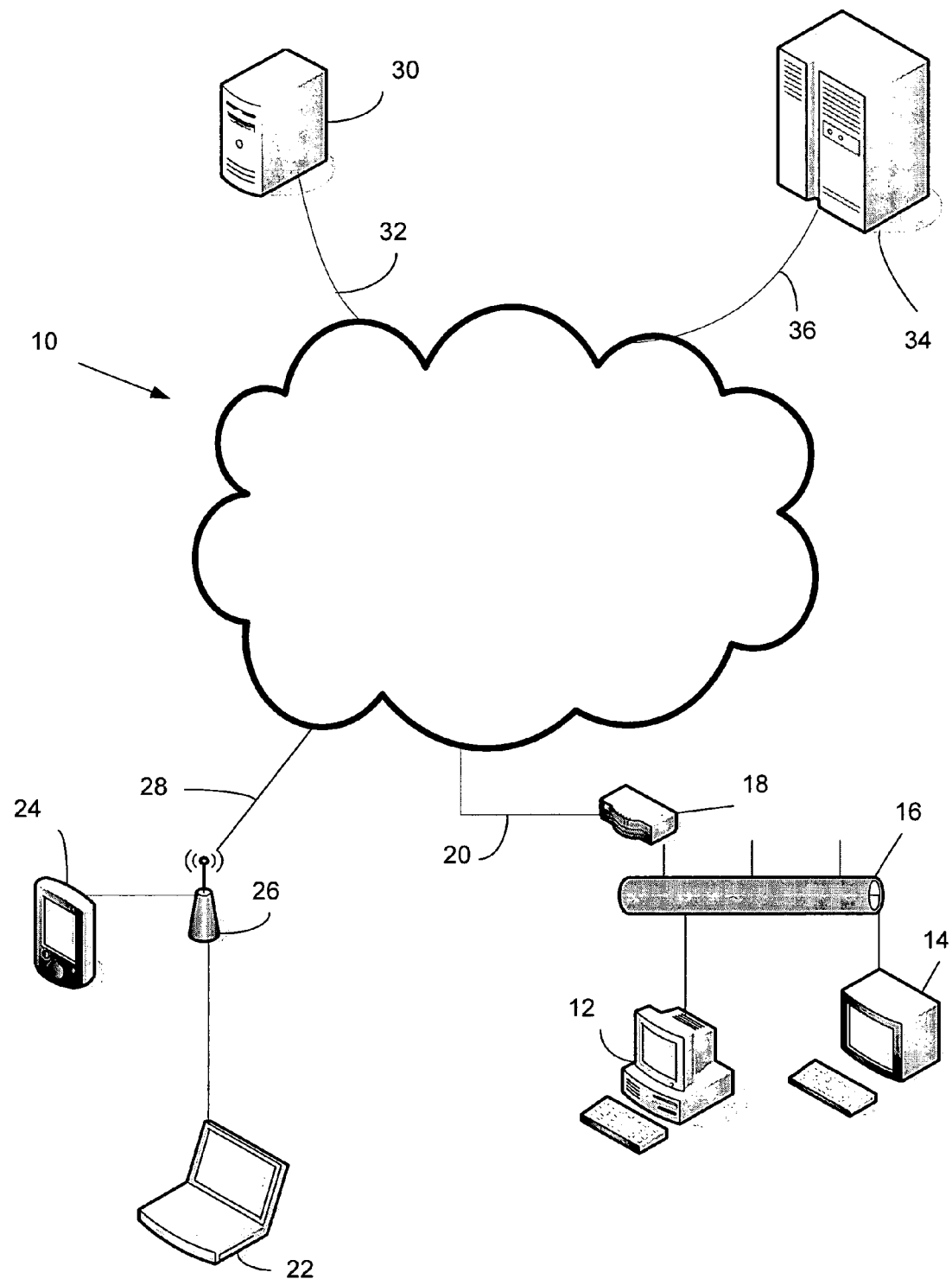
FIG. 1 is a simplified and representative block diagram of a computer network.
Figure 2:
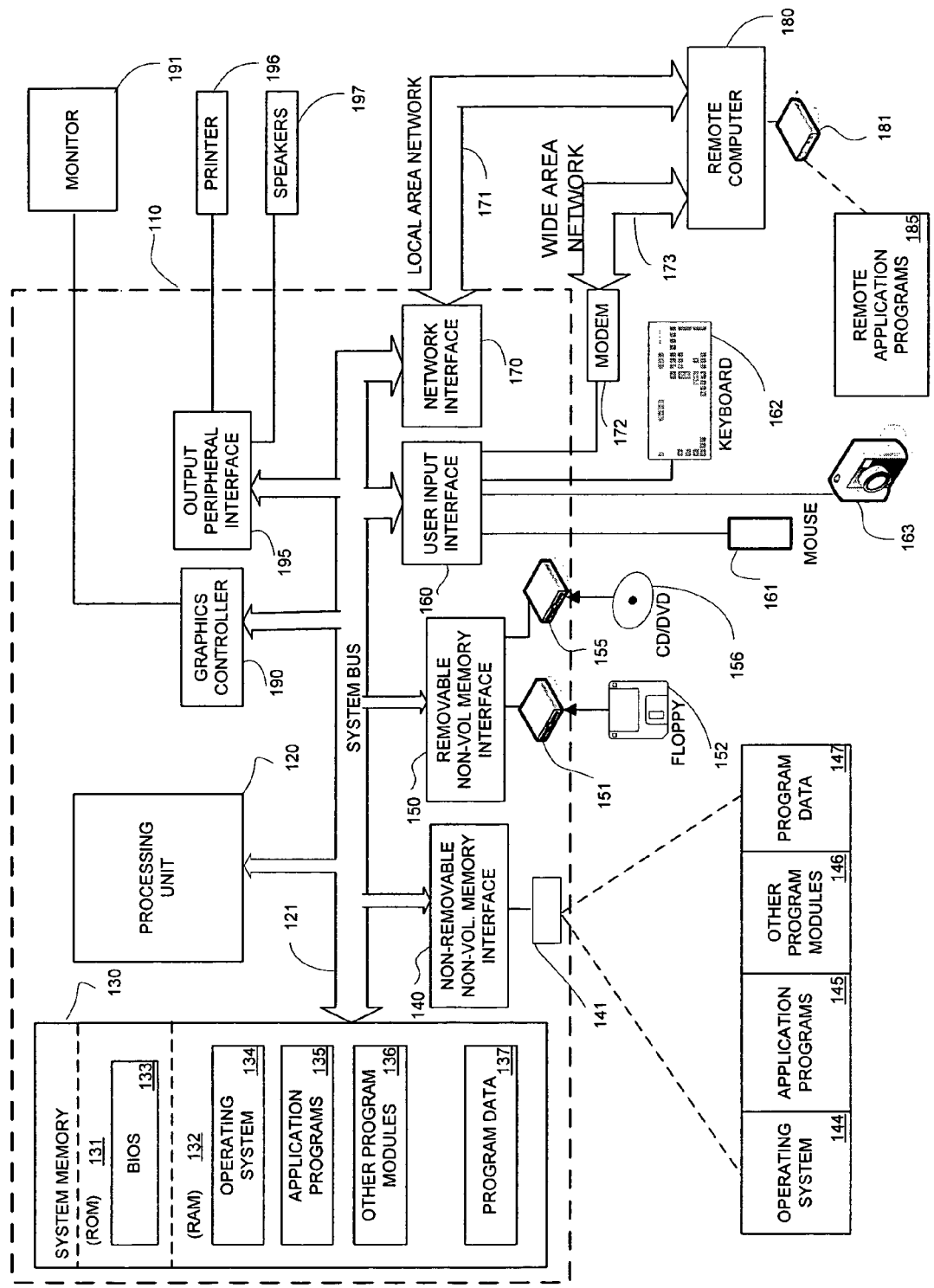
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, processes, peer-to-peer network endpoints, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
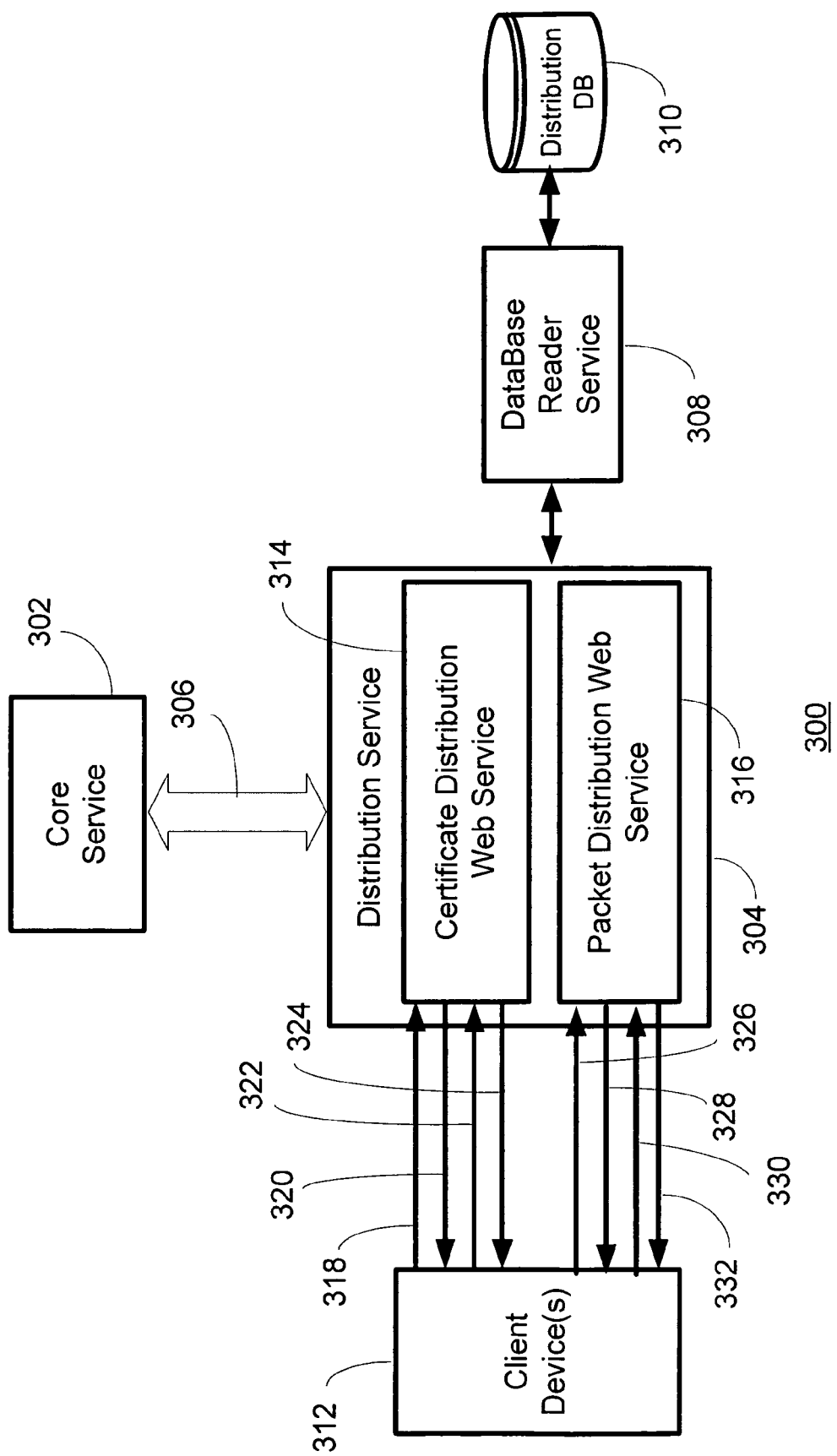
FIG. 3 is a simplified and representative block diagram of a provisioning system for prepaid and subscription-based computers showing client device message traffic for certificate and packet distribution.

FIG. 3 is block diagram of a provisioning system 300 for prepaid and subscription-based computers. The provisioning system 300 may include several server-side services such as a core service 302, a distribution service 304 coupled to the core service 302 by a message queue 306. A database reader service 308 may provide an interface to a distribution database 310. The distribution service 304 may be coupled to one or more client devices 312. The distribution service 304 may process requests from the client device 312 for one of several client data sets.

One client state data set that may be requested is a client certificate. The client certificate request may be part of an initial registration process. Following a successful server-side authorization, the client device may be sent a client certificate, for example, an X.509 formatted certificate, as is well known in the art. The client certificate may be used for signing and encryption of subsequent message traffic with the distribution service 304. Both prepaid and subscription client devices use this initial client device registration process and the client certificate.

Another client data set that may be requested is a provisioning packet. The provisioning packet may be used locally by the client device 312 to authorize use of the client device. In a prepaid business model, the provisioning packet may represent minutes of usage or other time-based measures. Minutes of usage are subtracted as used from a "bank" of minutes that may be stored locally, although remote provisioning may also be used. In a subscription business model, the provisioning packet may authorize usage over a specific period of time, such as a month. The distribution service 304 may include a certificate distribution web service 314 supporting the registration process and a packet distribution web service 316 supporting prepaid and subscription provisioning packet processing. More details about the overall operation of the prepaid and subscription business models for subsidized client devices may be found in pending U.S. patent application Ser. No. 10/989,122.

The client certificate request response process may involve a message 318 sent from the client device 312 to the certificate distribution web service 314. The upid, or underwriter program identifier, may represent an product or service offer made by an underwriter. In a prepaid or subscription product business model, the cost of the whole device, a peripheral, an operating system, application programs, etc. may be underwritten by a business entity, and compensated by on-going services revenue. An individual device may have more than one underwritten product, therefore the hardware ID plus the underwriter program identifier uniquely identifies each devices underwritten product or service. An exemplary call made by the client device 304 to initiate this message follows:

public string GetClientCertificate( string hardwareId, string initKey, string upid, string certificateRequest)

The message 318 may be sent responsive to the above call. An exemplary schema for the message 318 follows:

```
POST /Distribution/CertificateDistribution.asmx HTTP/1.1
Host: hostname
Content-Type: text/xml; charset=utf-8
Content-Length: length
    SOAPAction: "http://tempuri.org/GetClientCertificate"
    <?xml version="1.0"encoding="utf-8"?>
    <soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
    <soap:Body>
        <GetClientCertificate xmlns="http://tempuri.org/">
            <hardwareId>string</hardwareId>
            <initKey>string</initKey>
            <upid>string</upid>
            <certificateRequest>string</certificateRequest>
        </GetClientCertificate>
    </soap:Body>
</soap:Envelope>
HTTP/1.1 200 OK
Content-Type: text/xml; charset=utf-8
Content-Length: length
```

The Certificate Distribution Web Service 314 may verify the initialization key (Initkey) exists in the Distribution Database 310 with the correct Partner ID (UPID) and hardware identifier (HWID). The Partner ID may include not only a business partner identifier, but also a reference to a particular product, such as a subscription-based computer or a prepaid operating system. The web method may then submit a request to the Core Service 302 to issue the signature for the device's certificate. The signed public key certificate may be returned to the device as a string using message 320. In one embodiment, the certificate is an X.509 certificate in a base 64 string.

An exemplary schema for the message 320 follows:

```
<?xml version="1.0" encoding="utf-8"?>
    <soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
        <soap:Body>
            <GetClientCertificateResponse xmlns="http://tempuri.org/">
                <GetClientCertificateResult>string</GetClientCertificateResult>
            </GetClientCertificateResponse>
        </soap:Body>
    </soap:Envelope>
```

The client device may then send an acknowledgment message 322 using the following exemplary call:

public void PostCertificateAcknowledgement( string hardwareId, string initKey)

An exemplary schema for the acknowledgment message 322 follows:

```
POST /Distribution/CertificateDistribution.asmx HTTP/1.1
Host: hostname
Content-Type: text/xml; charset=utf-8
Content-Length: length
SOAPAction: "http://tempuri.org/PostCertificateAcknowledgement"
<?xml version="1.0"encoding="utf-8"?>
<soap:Envelope xmlns:xsi="http://www.w3.org/2001/XMLSchema-
instance"xmlns:xsd="http://www.w3.org/2001/XMLSchema"
xmlns:soap="http://schemas.xmlsoap.org/soap/envelope/">
    <soap:Body>
```

```
        <PostCertificateAcknowledgement xmlns="http://tempuri.org/">
            <hardwareId>string</hardwareId>
            <initKey>string</initKey>
        </PostCertificateAcknowledgement>
    </soap:Body>
</soap:Envelope>
HTTP/1.1 200 OK
Content-Type: text/xml; charset=utf-8
Content-Length: length
    <?xml version="1.0"encoding="utf-8"?>
    <soap:Envelope xmlns:xsi="http://www.w3.org/2001/XMLSchema-
    instance"xmlns:xsd="http://www.w3.org/2001/XMLSchema"
    xmlns:soap="http://schemas.xmlsoap.org/soap/envelope/">
    <soap:Body>
        <PostCertificateAcknowledgementResponse
            xmlns="http://tempuri.org/"/>
    </soap:Body>
</soap:Envelope>
```

The certificate distribution web service 314 may confirm the acknowledgement with message 324 using the following schema:

```
    <?xml version="1.0" encoding="utf-8"?>
    <soap:Envelope xmlns:xsi="http://www.w3.org/2001/XMLSchema-
    instance" xmlns:xsd="http://www.w3.org/2001/XMLSchema"
    xmlns:soap="http://schemas.xmlsoap.org/soap/envelope/">
        <soap:Body>
            <PostCertificateAcknowledgementResponse
    xmlns="http://tempuri.org/" />
        </soap:Body>
    </soap:Envelope>
```

After the registration of the client device 312 and receipt of the client certificate, normal operation may proceed in either the subscription or prepaid modes. Either initially, or at some point in the operation, re-provisioning of the client device 312 may be required. In one embodiment, a user of the client device 312 may purchase a scratch card and, using the client device 312, a telephone, or at a service center (not depicted), the user may transfer value from the scratch card to the account associated with client device 312. Provisioning packets may be prepared and queued, waiting for the client device 312 to request delivery. In other embodiments, the provisioning packets may be pushed.

The client device 312 may send a request message 326 to the packet distribution web service 316 to retrieve one or more pending provisioning packets. An exemplary call for requesting the provisioning packets is:
    public ProvisioningPacket[ ] GetProvisioningPackets(
        string hardwareId,
        string lastSequenceNumber)
Message 326, generated in response to the above call may include the following schema:

```
POST /distribution/packetdistribution.asmx HTTP/1.1
Host: hostname
Content-Type: text/xml; charset=utf-8
Content-Length: length
SOAPAction: "http://tempuri.org/GetProvisionPackets"
<?xml version="1.0"encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
    <soap:Body>
        <GetProvisionPackets xmlns="http://tempuri.org/">
            <hardwareId>string</hardwareId>
            <lastSequenceNumber>int</lastSequenceNumber>
        </GetProvisionPackets>
    </soap:Body>
</soap:Envelope>
HTTP/1.1 200 OK
Content-Type: text/xml; charset=utf-8
Content-Length: length
```

The packet distribution web service 316 may query the distribution database 310 and return all provisioning packets associated with the supplied hardware identifier (HWID) whose sequence numbers are higher than the sequence number supplied in the method call. The packet distribution web service 316 may contact the core service 302 notifying it that there was an attempt to download the packets.

The packet distribution web service 316 may return the identified provisioning packets in message 328 using the following schema:

```
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
    <soap:Body>
        <GetProvisionPacketsResponse xmlns="http://tempuri.org/">
            <GetProvisionPacketsResult>
                <string>string</string>
                <string>string</string>
            </GetProvisionPacketsResult>
        </GetProvisionPacketsResponse>
    </soap:Body>
<soap:Envelope>
```

The client device may acknowledge the receipt of the provisioning packets with message 330. An exemplary call for the acknowledge follows:
    public void PostPacketAcknowledgement(
        string hardwareId,
        string lastSequenceNumber)
The message 330 may have the following exemplary schema:

```
POST /distribution/packetdistribution.asmx HTTP/1.1
Host: zeyong2
Content-Type: text/xml; charset=utf-8
Content-Length: length
SOAPAction: "http://tempuri.org/PostPacketAcknowledgement"
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
    <soap:Body>
        <PostPacketAcknowledgement xmlns="http://tempuri.org/">
            <hardwareId>string</hardwareId>
            <lastSequenceNumber>int</lastSequenceNumber>
        <PostPacketAcknowledgement>
    </soap:Body>
</soap:Envelope>
HTTP/1.1 200 OK
Content-Type: text/xml; charset=utf-8
Content-Length: length
```

This method call, when processed, may remove the downloaded provisioning packets from the Distribution Database and notify the Core Provisioning Service that the provisioning packets have been received by the client device.

The packet distribution web service 316 may respond with an acknowledgment message 332 using the following exemplary schema:

```xml
<?xml version="1.0" encoding="utf-8"?>
<soap:Envelope xmlns:xsi="http://www.w3.org/2001/XMLSchema-
instance" xmlns:xsd="http://www.w3.org/2001/XMLSchema"
xmlns:soap="http://schemas.xmlsoap.org/soap/envelope/">
        <soap:Body>
                <PostPacketAcknowledgementResponse xmlns="http://tempuri.org/"/>
        </soap:Body>
</soap:Envelope>
```

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of processing prepaid and subscription requests for certificate provisioning and usage packet provisioning from client devices via a web service comprising:
   receiving a request for a first client data set from a client device that has a plurality of underwritten products or services deployed thereon, each given one of the plurality of underwritten products or services being paid for by an underwriter that is compensated by payments for prepaid or subscription usage of the given underwritten product or service on the client device, the request for the first client data set including a hardware identifier (HWID), an initialization key (InitKey), and an underwriter product identifier (UPID) representing a product or service offer made by an underwriter;
   processing the first request, including processing the HWID, the InitKey, and the UPID, the HWID and the UPID uniquely identifying one of the plurality of underwritten products or services deployed on the client device;
   responding with the first client data set to provide an initial registration of the client for the prepaid or subscription usage of the given underwritten product or service;
   receiving a first acknowledgment;
   confirming the first acknowledgment;
   receiving a request for a second client data set from the client device, the request for the second client data set including the HWID and a last-used provisioning packet sequence number;
   responding with the second client data set to provide a provisioning packet with a sequence number higher than the last-used provisioning packet sequence number included in the request for a second client data set from the client device;
   receiving a second acknowledgment; and
   confirming the second acknowledgment.

2. The method of claim 1, wherein receiving a request for a first client data set comprises receiving a request for a client certificate.

3. The method of claim 2, wherein responding with the client data set comprises sending the client certificate to the client device.

4. The method of claim 3, wherein sending the client certificate comprises sending an X.509 certificate to the client device.

5. The method of claim 2 wherein receiving the first acknowledgement comprises receiving the acknowledgment including the hardware identifier and the initialization key.

6. The method of claim 1, wherein receiving a request for a second client data set comprises receiving a request for a client provisioning packet.

7. The method of claim 6, wherein processing the request for a second client data set further comprises processing a last sequence number (LSN).

8. The method of claim 6, wherein responding with the second client data set comprises sending at least one provisioning packet to the client device.

9. The method of claim 6, wherein receiving the second acknowledgement comprises receiving the acknowledgment including the hardware identifier and the last-used provisioning packet sequence number (LSN).

10. The method of claim 1, wherein confirming the first acknowledgment comprises confirming the first acknowledgment with a message including a PostCertificateAcknowledgementResponse element and confirming the second acknowledgment comprises confirming the second acknowledgment with a message including a PostPacketAcknowledgementResponse element.

11. A computer storage medium having computer executable instructions for implementing a method of processing client device data set requests, the computer storage medium being a hardware computer storage medium, the method comprising: receiving a request for a first client data set from a client device that has a plurality of underwritten products or services deployed thereon, each given one of the plurality of underwritten products or services being paid for by an underwriter that is compensated by payments for prepaid or subscription usage of the given underwritten product or service on the client device, the request for the first client data set including a hardware identifier (HWID), an initialization key (InitKey), and an underwriter product identifier (UPID) representing a product or service offer made by an underwriter;
   processing the first request, including processing the HWID, the InitKey, and the UPID, the HWID and the UPID uniquely identifying one of the plurality of underwritten products or services deployed on the client device;
   responding with the first client data set to provide an initial registration of the client for the prepaid or subscription usage of the given underwritten product or service;
   receiving a first acknowledgment; confirming the first acknowledgment; receiving a request for a second client data set from the client device, the request for the second client data set including the HWID and a last-used provisioning packet sequence number;

responding with the second client data set to provide a provisioning packet with a sequence number higher than the last-used provisioning packet sequence number included in the request for a second client data set from the client device; receiving a second acknowledgment; and confirming the second acknowledgment.

12. The computer storage medium of claim 11, wherein responding with the client certificate comprises sending an X.509 certificate to the client device.

13. The computer storage medium of claim 12, wherein receiving the first acknowledgement comprises receiving the first acknowledgment including the hardware identifier and the initialization key.

14. The computer storage medium of claim 11, wherein confirming the second acknowledgment comprises confirming the second acknowledgment with a message including a PostPacketAcknowledgementResponse element.

15. The computer storage medium of claim 11, wherein confirming the first acknowledgment comprises confirming the first acknowledgment with a message including a PostCertificateAcknowledgementResponse element.

* * * * *